United States Patent [19]

Watson

[11] Patent Number: 5,137,122
[45] Date of Patent: Aug. 11, 1992

[54] WHEELS INCORPORATING BRAKING DISCS

[75] Inventor: John C. Watson, Ness, England

[73] Assignee: Sab Wabco Holdings, B.V., Heerhugowaard, Netherlands

[21] Appl. No.: 615,701

[22] Filed: Nov. 5, 1990

[30] Foreign Application Priority Data

Nov. 7, 1989 [GB] United Kingdom ................ 8925101

[51] Int. Cl.$^5$ ............................................. F16D 65/12
[52] U.S. Cl. ........................... 188/218 XL; 192/107 R
[58] Field of Search ............ 188/218 XL, 73.1, 73.2, 188/250 G, 245, 246, 247; 192/107 C, 107 R

[56] References Cited

U.S. PATENT DOCUMENTS

| | | | |
|---|---|---|---|
| 2,027,650 | 1/1936 | Nutt | 192/107 C |
| 2,249,281 | 7/1941 | Wellman | 192/107 C |
| 2,767,817 | 10/1956 | Davis | 188/218 XL |
| 3,724,612 | 4/1973 | Spain | 188/218 XL |

FOREIGN PATENT DOCUMENTS

| | | | |
|---|---|---|---|
| 613540 | 1/1961 | Canada | 188/250 G |
| 0062774 | 10/1982 | European Pat. Off. | |
| 1287967 | 2/1962 | France | |
| 2108226 | 5/1972 | France | |
| 499589 | 1/1939 | United Kingdom | 192/107 C |
| 690145 | 4/1953 | United Kingdom | 188/218 XL |
| 1151060 | 5/1969 | United Kingdom | 188/218 XL |
| 2121895 | 1/1984 | United Kingdom | |
| 2130321 | 5/1984 | United Kingdom | |

*Primary Examiner*—George E. A. Halvosa
*Attorney, Agent, or Firm*—Oblon, Spivak, McClelland, Maier & Neustadt

[57] ABSTRACT

A wheel comprises a central hub and an outer rim interconnected by a web, with a pair of annular braking discs being mounted one on each side of the web by connection assemblies each comprising a plate member slidably retained in a generally radially extending slot in the rear face of a braking disc. The plate members are preferably flexible and of a thickness less than the depth of the slot. Bolts secure the plate member to the web so that the braking discs are solely subjected to the pull of the flexed plate members irrespective of how tightly the bolts secure the plate member to the web.

6 Claims, 2 Drawing Sheets

WHEELS INCORPORATING BRAKING DISCS

DESCRIPTION

The present invention relates to a wheel incorporating a braking disc.

In particular the present invention relates to a wheel, primarily for use on railway vehicles, comprising a central hub and an outer rim interconnected by a web, an integral annular braking disc being mounted on each side of the wheel.

Certain known wheels of the above described construction have annular braking discs which are merely bolted to the web of the wheel, the bolts each passing first through an aperture in one braking disc and then, usually with clearance, through an aperture in the web, the bolts engaging in complementarily threaded bores in the other braking disc or passing through apertures in the other braking disc and being engaged with complementarily threaded nuts. To provide for a smooth braking surface in the respective discs, the said apertures in the braking discs are located in recesses in the braking surface. The braking discs thus sandwich the web of the wheel and expansion of the braking discs due to the heat generated under braking is allowed for by the bolts being able to move in the apertures in the web.

However, whilst the braking discs can be positively secured to the wheel in this manner and the radial extent of the braking disc can be maximized having regard to the distance between the hub and outer rim, there is a stress problem which occurs around the apertures in the braking discs, through which the bolts pass, the bolts having to be tightened to hold the disc against the web and the resultant thermal stress forces leading to localised stress cracking in the braking discs as a consequence of the continued heating and cooling of the braking discs under braking.

The aim of the present invention is to provide a wheel wherein the braking discs are indirectly secured to the web so as to allow for expansion and contraction due to the heat produced and dissipated under braking, whilst avoiding the above stress problems resulting from direct attachment.

According to the present invention there is provided a wheel comprising a central hub and an outer rim interconnected by a web, a pair of annular braking discs being mounted one on each side of the web, each annular braking disc being secured to the web by at least two connection assemblies, each connection assembly comprising a plate member which is slidably received in a generally radially extending slot in the rear face of a braking disc, the plate member having an aperture which extends through the plate member and is aligned with an aperture in the braking disc and an aperture in the web, attachment means securing the plate member to the web.

It is proposed that the plate member will preferably be generally rectangular and have laterally projecting lugs at opposite end regions, which lugs engage under inwardly directed lips provided on each side of the slot in the braking disc. With plate members located in each slot in the rear face of each braking disc, the two braking discs can be located one on each side of the web with said apertures aligned. Bolts forming said attachment means are then engaged through the aligned apertures of one braking disc, the web, and the aligned apertures of the other braking disc. Nuts are applied to the bolts and the bolts tightened to thus draw the plate members against the web, the braking discs being supported on the plate members and thus being free of any stresses produced by tightening the nuts and bolts.

In a preferred embodiment of the present invention there are three equi-spaced apart connection means. However, more than three connection means can of course be provided, if desired. Also, the lips on each side of the slot preferably present a dovetail configuration with the lugs on the plate members complementarily profiled. Further, the plate member is preferably thinner than the depth of the slot, with the mating dovetail arrangement designed to hold the planar member against the base of the slot in the braking disc. With this arrangement the plate members are preferably resiliently flexible so that when the braking discs are secured to the web, the braking discs enage the web and the plate members flex to also engage the web, as the bolts are tightened. In this way the plate members are designed to apply a particular holding force to the braking discs, which force is dictated by the flexibility of the plate members and cannot be exceeded no matter how tight the bolts are torqued. Thus the stress problems of prior art direct attachment arrangements are obviated.

With this construction the maximum braking surface is available having regard to the limiting distance between the hub and outer rim, with only access apertures, three in the preferred embodiment, reducing the braking surface.

The present invention will now be further described, by way of example, with reference to the accompanying drawings, in which.

Figure 1:
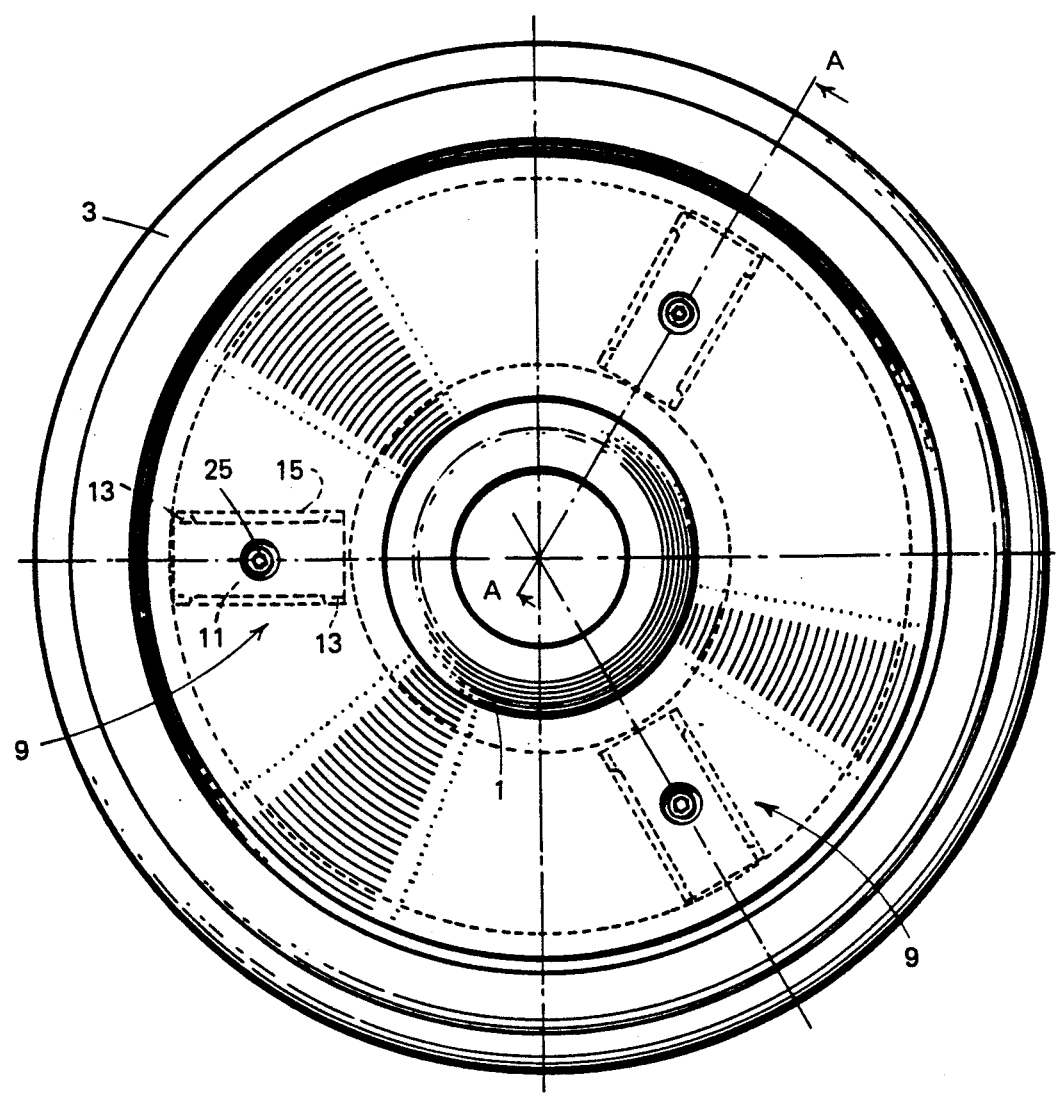
FIG. 1 is a front view of a preferred embodiment of the present invention.

The preferred embodiment of the present invention illustrated in the accompanying drawings comprises a central hub 1 and an annular outer rim 3, interconnected by a web 5. An integral annular braking disc 7 is attached to each side of the web 5, by means of connection assemblies 9. Each braking disc 7 has three equi-spaced apart connection assemblies. Alternatively, two, or four or more, connection assemblies can be used.

Each connection assembly 9 comprises a generally rectangular plate member 11 with laterally projecting lugs 13 provided at each corner region of the plate member 11. Each lug 13 has a configuration which tapers laterally of the plate member and which is complementary to the sides of a slot 15 formed on the rear face of the braking disc 7. The sides of the slot 15 are thus formed with an inwardly directed lip 17 which, together with the projections 13, forms a dovetail arrangement. Whilst this dovetail arrangement is preferred, the lugs and lips can of course have any desired interengaging configuration.

Figures 2, 3:
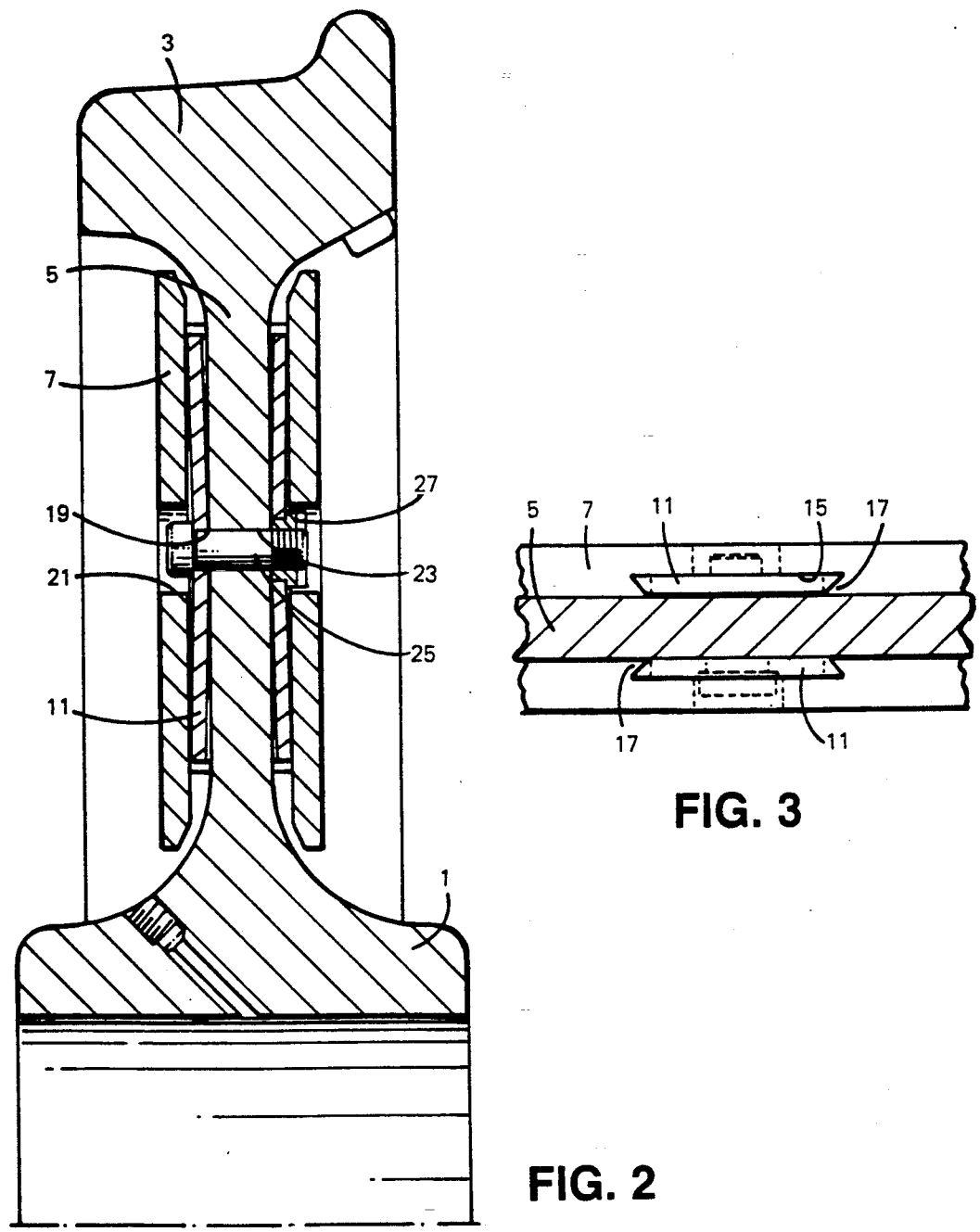
FIG. 2 is a cross-sectional view taken along line A—A in FIG. 1.
FIG. 3 is an end view of one of the connection means of the embodiment of FIGS. 1 and 2.

As seen in FIG. 3, the plate member 11 is slightly thinner than the depth of the slot 15 and the dovetail arrangement is such that the plate member 11 is held against the base of the slot 15, the plate member 11 being made so as to be flexibly resilient for the purpose discussed herebelow.

The plate member 11 has an aperture 19 extending through its middle region, this aperture 19 being aligned with an access aperture 21 in the braking disc 7.

With a plate member 11 located in each slot 17 in the rear face of two braking discs 7, the braking discs 7 are engaged with opposite sides of the web 5, with said apertures 19,21 aligned with corresponding apertures 23 in the web 5. Bolts 25 are then passed through the aligned apertures 19,21 in one braking disc 7, through the apertures 23 in the web 5, and through corresponding aligned apertures 19,21 in the other braking disc 7. Nuts 27 are then engaged with the bolts 25 and the bolts are tightened. As the bolts 25 are tightened the plate members 11 flex until they engage the web 5. Thus the braking discs 7 are held against the web 5 by the resilience of the plate members 11 and no further force can be applied to the braking discs 7 irrespective of how tight the bolts 25 are torqued. Further, the radial extent of the braking surface is thus maximised having regard to the limits of the hub and outer wheel, the surface being solely reduced in area by the necessary provision of the access apertures 21.

In use, heat energy generated by braking causes the braking discs 7 to expand and contract as the energy is dissipated. This is allowed for as the slots 17 can slide radially along the plate members 11.

Thus the present invention provides a simple but positive means of attaching braking discs to the web of a wheel whilst maximising the radial extent of the braking surface having regard to the limits of the hub and outer rim. The attachment means limits the attachment force and thus limits the stress applied to the braking discs, whilst allowing for the expansion and contraction of the braking discs as occurs as a result of the heat generated and dissipated under braking.

I claim:

1. A wheel comprising a central hub and an outer rim interconnected by a web, a pair of annular braking discs being mounted one on each side of the web, each annular braking disc being secured to the web by at least two connection assemblies, each connection assembly comprising a flexibly resilient plate member, means slidably retaining said plate member in a generally radially extending slot in the rear face of a braking disc, said plate member having a thickness which is less than the depth of said slot, said retaining means being designed to hold said plate member when in an unflexed condition in said slot below the rear face of said braking disc, an aperture extending through said plate member and aligned with an aperture in said braking disc with an aperture in said web, and attachment means passing through said aligned apertures in said plate member and web to flex said plate member towards said web, thereby securing said plate member and hence said disc to said web, with the force exerted on said disc being limited by the degree of flexibility of said plate due to the flexible resilience of said plate being selected to enable said attachment means to flex said plate into engagement with said web with unlimited force without excessively stressing said disc.

2. A wheel according to claim 1 wherein said retaining means comprise laterally projecting lugs on each plate member and which engage under inwardly directed lips provided on each side of said slot.

3. A wheel according to claim 1, wherein each plate member and slot are generally rectangular, each plate member having laterally projecting lugs at opposite end regions, which lugs engage under inwardly directed lips provided along each radially extending side of said slot.

4. A wheel according to claim 3, wherein said lips present a dovetail configuration with the lugs on the plate members being complementarily profiled.

5. A wheel according to claim 1, wherein the attachment means are in the form of nuts and bolts with a single nut and bolt assembly securing two plate members, one on each side of the web, to the web.

6. A wheel according to claim 1 wherein said retaining means is designed to hold said plate member when in an unflexed condition against the base of said slot in said braking disc.

* * * * *